C. A. TATUM.
Ball-Target.
No. 206,983. Patented Aug. 13, 1878.
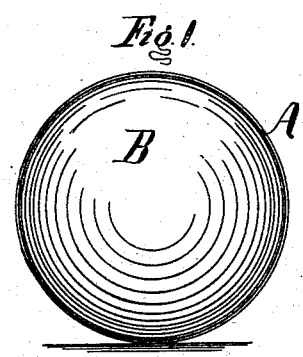
Fig. I.
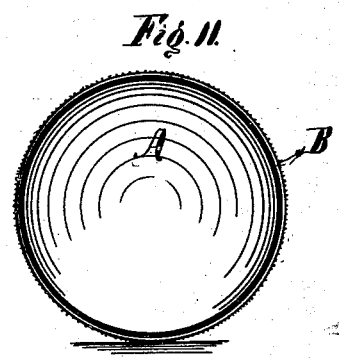
Fig. II.
Witnesses:
Inventor:
Charles A. Tatum
Per:
Richard Lerner
Att'y.

UNITED STATES PATENT OFFICE.

CHARLES A. TATUM, OF NEW YORK, N. Y.

IMPROVEMENT IN BALL-TARGETS.

Specification forming part of Letters Patent No. 206,983, dated August 13, 1878; application filed July 3, 1878.

*To all whom it may concern:*

Be it known that I, CHARLES A. TATUM, of the city of New York, county of New York, and State of New York, have invented new and useful Improvements in Spherical Glass Targets; and I hereby declare that the following is an exact and true description of my invention, which will enable others to make and use the same, reference being had to the accompanying drawings, forming a part of this specification.

The object of my invention is to provide for improved glass balls intended to be thrown from a trap, for the purpose of practice-shooting with shot-guns, rifles, or pistols.

The balls heretofore made for this purpose have surfaces partly flattened, serrated, or corrugated, in order to prevent the shots from glancing off from the balls. The flattening, serrating, or corrugating of the surfaces of glass target-balls is, however, objectionable, as these places or spots become stronger and present more resistance to the shots than the other spots or places of the balls.

The principal defect of glass target-balls is, furthermore, by this construction of the balls, not obviated, but rather increased.

It is evident that a glass target-ball shot up in the air presents a shining surface to the gunner's eye, which, especially when the sun shines, prevents him from taking accurate aim. This glaring effect is rather increased when the smooth glass surface is corrugated, serrated, or flattened, as the surface is increased and made to present different angles for the light to take effect upon and again deflect the rays from.

In order to obviate these difficulties I make glass balls of uniform thickness with a smooth surface, and make these balls opaque and with a roughened surface by dipping them in a bath of a suitable glutinous or adhesive substance, and after this expose them to be dusted or covered with suitable metallic or mineral substances, granulated or pulverized, coarse or fine, as may be desired. When this glutinous substance is dried by exposure to the air or to artificial heat it will be found that the whole surface of the ball is covered with a rough coating, on which the shots take much better effect than on this smooth glass, and prevents entirely the glaring effect of the glass. These so-covered balls are of uniform strength, and stronger than glass balls without such coating.

Referring to the drawings, Figure 1 represents a side view of my improved spherical glass target. Fig. 2 is a sectional view of the same.

A is the glass ball, covered with the coating B.

I am aware that glass target-balls have been constructed with an abrasive surface, which is formed or produced simultaneously with the blowing of the ball, and, too, while the glass is in a molten state and before completion, and therefore do not claim such; but What I do claim is—

The herein-described method of constructing frangible target-balls, consisting in blowing or molding a hollow opaque sphere, coating it with adhesive substance, and superposing a coating of abrasive material, substantially as specified.

CHARLES A. TATUM.

Witnesses:
F. M. UNDERHILL,
JAS. B. WILLIS.